United States Patent
Jin et al.

(10) Patent No.: US 10,246,800 B2
(45) Date of Patent: Apr. 2, 2019

(54) METHOD FOR MANUFACTURING POLYESTER FABRIC FOR AIRBAG

(71) Applicant: KOLON INDUSTRIES, INC., Gwacheon-si, Gyeonggi-do (KR)

(72) Inventors: Hye-Seung Jin, Yongin-si (KR); Sang-Mok Lee, Yongin-si (KR); Gi-Woong Kim, Yongin-si (KR); Jung-Hoon Youn, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 0 days.

(21) Appl. No.: 15/515,648

(22) PCT Filed: Sep. 25, 2015

(86) PCT No.: PCT/KR2015/010241
§ 371 (c)(1),
(2) Date: Mar. 30, 2017

(87) PCT Pub. No.: WO2016/052961
PCT Pub. Date: Apr. 7, 2016

(65) Prior Publication Data
US 2017/0298542 A1   Oct. 19, 2017

(30) Foreign Application Priority Data
Sep. 30, 2014   (KR) ........................ 10-2014-0131720

(51) Int. Cl.
| | |
|---|---|
| *D03D 1/02* | (2006.01) |
| *D01F 6/62* | (2006.01) |
| *B60R 21/235* | (2006.01) |
| *D06M 15/507* | (2006.01) |
| *D06N 3/00* | (2006.01) |
| *D06L 1/14* | (2006.01) |
| *D06M 101/32* | (2006.01) |

(52) U.S. Cl.
CPC ............. *D03D 1/02* (2013.01); *B60R 21/235* (2013.01); *D01F 6/62* (2013.01); *D06L 1/14* (2013.01); *D06M 15/507* (2013.01); *D06N 3/0036* (2013.01); *B60R 2021/23514* (2013.01); *B60R 2021/23542* (2013.01); *D06M 2101/32* (2013.01); *D06M 2200/40* (2013.01); *D06N 2203/066* (2013.01); *D06N 2209/125* (2013.01); *D06N 2211/268* (2013.01); *D10B 2331/04* (2013.01); *D10B 2505/124* (2013.01)

(58) Field of Classification Search
None
See application file for complete search history.

(56) References Cited

U.S. PATENT DOCUMENTS

| | | |
|---|---|---|
| 2004/0161604 A1 | 8/2004 | DeMott |
| 2007/0184733 A1 | 8/2007 | Manley |
| 2011/0165806 A1 | 7/2011 | Kim et al. |
| 2015/0239419 A1 | 8/2015 | Jin et al. |

FOREIGN PATENT DOCUMENTS

| | | | |
|---|---|---|---|
| CN | 102144057 A | | 8/2011 |
| CN | 102985296 A | | 3/2013 |
| EP | 2 586 664 A1 | | 5/2013 |
| KR | 10-2013-0017942 A | | 2/2013 |
| KR | 1020130017942 | * | 2/2013 |
| KR | 10-2014-0043005 A | | 4/2014 |

OTHER PUBLICATIONS

International Searching Authority, International Search Report of PCT/KR2015/010241, dated Dec. 17, 2015. [PCT/ISA/210].
State Intellectual Property Office of the P.R.C: Communication dated Jul. 27, 2018 in counterpart application No. 201580052816.1.

* cited by examiner

*Primary Examiner* — Nathan T Leong
(74) *Attorney, Agent, or Firm* — Sughrue Mion, PLLC

(57) ABSTRACT

Disclosed is a method for manufacturing a polyester fabric for an airbag that can not only prevent or minimize the separation of a sizing agent, which is provided to a yarn through a sizing process, during a weaving process, but can also maximize a peel strength between a textile substrate and a coating layer to be subsequently formed thereon and lower the stiffness of an airbag fabric by effectively removing the sizing agent from the textile substrate after the weaving process is completed. The method of the present invention comprises: applying a polyester-based sizing agent to a polyester yarn; manufacturing a textile substrate with the sizing agent-applied polyester yarn; removing the sizing agent from the textile substrate under an alkaline condition of pH 8 to 10; and forming a coating layer on the sizing agent-removed textile substrate in order to enhance airtightness.

8 Claims, No Drawings

METHOD FOR MANUFACTURING POLYESTER FABRIC FOR AIRBAG

CROSS REFERENCE TO RELATED APPLICATIONS

This application is a National Stage of International Application No. PCT/KR2015/010241 filed Sep. 25, 2015, claiming priority based on Korean Patent Application No. 10-2014-0131720, filed Sep. 30, 2014, the contents of all of which are incorporated herein by reference in their entirety.

TECHNICAL FIELD

The present invention relates to a method for manufacturing a polyester fabric for an airbag, and more particularly, to a method for manufacturing a polyester fabric for an airbag that can not only prevent or minimize the separation of a sizing agent, which has been provided to a yarn through a sizing process, during a weaving process, but also maximize a peel strength between a textile substrate and a coating layer to be subsequently formed thereon and lower the stiffness of an airbag fabric, by effectively removing the sizing agent from the textile substrate after the weaving process.

BACKGROUND ART

When an impact on a vehicle, which is caused by a crash or overturn of the vehicle running at not lower than a predetermined speed, is detected by an impact detecting sensor, an airbag is inflated and developed so as to protect a driver and passenger(s).

Generally, a fabric for an airbag comprises, in addition to a textile substrate, a coating layer to enhance the air-tightness of the fabric.

While a polyamide yarn such as nylon 66 yarn was mainly used for preparing the textile substrate, a polyester yarn for an airbag, which can replace the polyamide yarn, is under research and developments these days in order to satisfy the needs of cost reduction.

The textile substrate may be a woven fabric of plain weave pattern or basket weave pattern, or a woven fabric of OPW (One Piece Woven) type. The woven fabric is prepared by interlacing warp and weft threads in various manners. For example, according to a plain weaving method, the warp threads alternately and periodically ascend and descend between relatively high and relatively low positions, thereby forming spaces, and the weft threads are inserted in the spaces in a direction substantially perpendicular to the warp threads.

The warp threads for the weaving process may be prepared by sequentially performing a warping process, sizing process, beaming process, drawing-in process, etc. In the warping process, the warp threads unwound from a creel are arranged based on the designed warp density and width, and the designed length of the warp threads are wound on a warper beam. In the beaming process, a plurality of warp threads provided from a warper beam are put together in accordance with the warp number of the designed fabric and are wound on a loom beam. In the sizing process performed right before the warp threads are wound on the loom beam, a sizing agent is applied to the warp threads in order to improve their bundling and weaving properties. In the drawing-in process, the warp threads wound on the loom beam are mounted on dropper, heald, and reed. A weaving process for interlacing the as-prepared warp threads with weft threads is carried out to complete a woven fabric.

The sizing agent conventionally used in the sizing process to improve the weavability of the woven fabric for an airbag is an acryl-based sizing agent. Since the acryl-based sizing agent has worse adhesive strength to a polyester yarn compared to its adhesive strength to a polyamide yarn, however, a problem of its separation from the polyester yarn during the weaving process occurs.

Once the weaving process is completed, the sizing agent adhered to the yarn functions as an impurity, thereby decreasing the peel strength between the textile substrate and coating layer and increasing the stiffness of the airbag fabric as well. Particularly, since an airbag mounted in a vehicle is maintained in an enclosed space for a long time until an accident occurs, the adhesive strength between the textile substrate and coating layer is likely to further deteriorate, thereby increasing the risk that the coating layer will easily peel off from the textile substrate when the airbag is developed by an inflator.

DISCLOSURE

Technical Problem

Accordingly, the present invention is directed to a method for manufacturing a polyester fabric for an airbag, that substantially obviate one or more problems due to limitations and disadvantages of the related art.

An aspect of the present invention is to provide a method for manufacturing a polyester fabric for an airbag that can not only prevent or minimize the separation of a sizing agent, which has been provided to a yarn through a sizing process, during a weaving process, but also maximize a peel strength between a textile substrate and a coating layer to be subsequently formed thereon and lower the stiffness of an airbag fabric, by effectively removing the sizing agent from the textile substrate after the weaving process.

Additional aspects and features of the present invention will be set forth in part in the description which follows and in part will become apparent to those having ordinary skill in the art upon examination of the following or may be learned from practice of the invention.

Technical Solution

In accordance with the aspect of the present invention, there is provided a method for manufacturing a polyester fabric for an airbag, the method comprising: applying a polyester-based sizing agent to a polyester yarn; manufacturing a textile substrate with the sizing agent-applied polyester yarn; removing the sizing agent from the textile substrate under an alkaline condition of pH 8 to 10; and forming a coating layer on the sizing agent-removed textile substrate in order to enhance air-tightness.

The removing the sizing agent may comprise having the textile substrate pass through a scouring solution of pH 8 to 10.

The scouring solution may comprise water; and an alkaline compound, a permeating agent, an insolubilizing agent, and a desizing agent, all of which are dissolved in the water.

Dissolved in the water are 100 parts by weight of the alkaline compound, 160 to 190 parts by weight of the permeating agent, 190 to 220 parts by weight of the insolubilizing agent, and 450 to 550 parts by weight of the desizing agent.

The removing the sizing agent may further comprise having the textile substrate, which has passed through the scouring solution, pass through a washing solution.

The washing solution may consist essentially of water.

The scouring solution may be contained in first and second scouring baths, the washing solution may be contained in first, second, and third washing baths, the scouring solution in the first scouring bath may be maintained at 50 to 70° C., the scouring solution in the second scouring bath may be maintained at 75 to 95° C., the washing solution in the first washing bath may be maintained at 70 to 90° C., the washing solution in the second washing bath may be maintained at 70 to 90° C., and the washing solution in the third washing bath may be maintained at 40 to 60° C.

The textile substrate may pass through the scouring solution and washing solution at a speed of 10 to 21 m/min.

The method may further comprise, prior to forming the coating layer, the steps of drying the sizing agent-removed textile substrate and heat-setting the dried textile substrate.

The step of heat-setting may be carried out at 150 to 190° C.

It is to be understood that both the foregoing general description and the following detailed description of the present invention are exemplary and explanatory and are intended to provide further explanation of the invention as claimed.

Advantageous Effects of Invention

According to the present invention, a sizing agent having an excellent adhesive strength to a polyester yarn used for manufacturing a textile substrate is made use of so that the separation of the sizing agent during the weaving process can be prevented or minimized and the processability can be improved.

Additionally, the sizing agent is effectively removed from the textile substrate under an optimized condition after the textile substrate is completed through the weaving process, so that the stiffness of the airbag fabric can be minimized and the peel strength between the textile substrate and coating layer can be improved.

Furthermore, the airbag manufactured by means of the airbag fabric of the present invention can have excellent foldability and storability owing to the low stiffness of the fabric, can have excellent internal pressure-maintaining property owing to the high peel strength between the textile substrate and coating layer, and, as a result, can guarantee the safety of the driver and passenger(s), which is the true object of the airbag, more definitely.

MODE FOR INVENTION

Hereinafter, a method of the present invention for manufacturing a polyester fabric for an airbag will be described in detail. The following description is just about the examples presented to help the understanding of the present invention, and it will be obvious to a person of ordinary skill in the art that various modification and alteration of the invention are possible within the scope of the present invention.

"Polyester-based sizing agent" as used herein refers to a sizing agent based on a polyester resin, and "acryl-based sizing agent" as used herein refers to a sizing agent based on an acrylic resin.

The method of the present invention for manufacturing a polyester fabric for an airbag comprises preparing a polyester yarn, applying a polyester-based sizing agent to the polyester yarn, manufacturing a textile substrate with the sizing agent-applied polyester yarn, removing the sizing agent from the textile substrate under an alkaline condition of pH 8 to 10, and forming a coating layer on the sizing agent-removed textile substrate in order to enhance the air-tightness.

The polyester yarn as used herein is defined as a yarn comprising 90% by mole or more of polyester resin (e.g., PET resin).

The polyester yarn may be manufactured by forming a polyester undrawn yarn through a melt-spinning process performed at a spinning speed of 300 to 1,000 m/min under 270 to 320° C., and then drawing the polyester undrawn yarn at a total draw ratio of 5 to 7. The polyester undrawn yarn may be manufactured by performing a cooling process with a cooling air of 15 to 60° C. after melt-spinning of a polyester polymer. The drawing process may be performed after the undrawn yarn passes through godet roller(s) under the condition of oil pick-up amount of 0.2 to 2%. A process for heat-setting the drawn yarn may be performed additionally at 170 to 250° C.

Alternatively, the polyester yarn may be manufactured through a direct spinning & drawing (DSD) method in which the spinning and drawing are carried out in a single process.

The polyester yarn may comprise a plurality of monofilaments each of which has a linear density of 2.5 to 5.5 denier, and may have a total linear density of 315 to 600 denier.

The linear density of the monofilament should be not less than 2.5 denier in order to prevent or minimize the fiber cut which otherwise might occur during the spinning process. On the other hand, considering the cooling efficiency of the melt passing through the spinneret, the linear density of the monofilament is preferably not more than 5.5 denier.

Further, the total linear density of the yarn should be not less than 315 denier in order to maintain the excellent mechanical property (e.g., strength) in view of the absorption performance to absorb the development energy of high-temperature and high-pressure when the airbag is developed. On the other hand, the total linear density of the yarn is preferably not more than 600 denier for the foldability and weight reduction of the airbag.

A sizing agent is applied to the polyester yarn in order to guarantee the excellent weavability which is required when a textile substrate for an airbag fabric is manufactured.

The sizing agent is required to not only be able to improve the weavability of the yarn but also have high adhesive strength to the yarn used for manufacturing the textile substrate. If the adhesive strength between the yarn and sizing agent is not good, a problem of separation of the sizing agent during the weaving process occurs.

As described above, the sizing agent conventionally used to improve the weavability of the woven fabric for an airbag is an acryl-based sizing agent. Since the acryl-based sizing agent has worse adhesive strength to a polyester yarn compared to its adhesive strength to a polyamide yarn, however, a problem of its separation from the polyester yarn during the weaving process occurs.

The continuous research conducted by the present inventors has revealed that a polyester-based sizing agent can improve the weavability of the polyester yarn and has excellent adhesive strength to the polyester yarn as well.

That is, according to the present invention, the sizing agent applied to the polyester yarn comprises a polyester resin. A weaving process is carried out after applying a polyester-based sizing agent instead of a aryl-based sizing agent to the polyester yarn, so that the separation of the sizing agent during the weaving process can be prevented or minimized and the processability can be improved.

The textile substrate manufactured with the polyester yarn to which the sizing agent of the present invention has been applied may be a woven fabric having warp and weft threads or a knitted fabric.

The warp and weft threads of the woven fabric may be interlaced in a variety of manners. For example, the textile substrate may be a woven fabric of plain or basket weave pattern or a woven fabric of OPW (One Piece Woven) type.

According to an embodiment of the present invention, the textile substrate may be a woven fabric having a cover factor (CF), as defined by the following formula 1, of 1,800 to 2,460.

$$\text{warp density(yarns/inch)} \times [\text{linear density of warp (denier)}]^{1/2} + \text{weft density(yarns/inch)} \times [\text{linear density of weft(denier)}]^{1/2} \quad \text{Formula 1:}$$

If the cover factor of the textile substrate is less than 1,800, the airbag fabric cannot satisfy the industry requirements regarding the air-blocking property and internal pressure-maintaining property even if a coating layer is formed thereon. On the other hand, if the cover factor is more than 2,460, the foldability of the airbag deteriorates in such a degree that it is difficult to store the airbag.

The resulting textile substrate of the present invention still comprises the polyester-based sizing agent. As described above, since the sizing agent on/in the textile substrate functions as an impurity, it not only decreases the peel strength between the textile substrate and coating layer to be subsequently formed thereon but also increases the stiffness of the airbag fabric. The low peel strength between the textile substrate and coating layer causes the coating layer to peel off easily from the textile substrate when the airbag is developed, thereby decreasing the air-blocking property and internal pressure-maintaining property of the airbag, which are required for the safety of the driver and passenger(s). Further, the high stiffness of the airbag fabric lowers the foldability of the airbag.

Therefore, according to the present invention, a process for removing the polyester-based sizing agent from the textile substrate is performed.

To sufficiently lower the content of the remaining sizing agent before forming a coating layer on the textile substrate, the conditions of the process should be set properly based on the kind of the sizing agent.

It is found by the present inventors that, when the very strong alkaline condition of not less than pH 11 for removing an acryl-based sizing agent which is conventionally used in this art is applied to the process for removing the polyester-based sizing agent, the polyester resin contained in the sizing agent becomes hardened. It is guessed that the production of salts through an acid-base reaction causes such phenomenon. Due to such phenomenon, the stiffness of the airbag fabric increases, and thus the foldability of the airbag decreases.

The continuous research conducted by the present inventors has revealed that, when the relatively weak alkaline condition of pH 8 to 10 is applied to the process for removing the polyester-based sizing agent from the textile substrate, the polyester-based sizing agent can be most effectively removed from the textile substrate.

Hereinafter, the process for removing the sizing agent according to an embodiment of the present will be explained in more detail.

The process of the present invention for removing the sizing agent may comprise a step of having the textile substrate pass through a scouring solution of pH 8 to 10. The scouring solution may comprise water; and an alkaline compound, a permeating agent, an insolubilizing agent, and a desizing agent all of which are dissolved in the water.

100 parts by weight of the alkaline compound, 160 to 190 parts by weight of the permeating agent, 190 to 220 parts by weight of the insolubilizing agent, and 450 to 550 parts by weight of the desizing agent may be dissolved in the water of the scouring solution.

For example, the scouring solution of the present invention may be prepared by dissolving about 2.2 kg of the alkaline compound, about 1.7 to 1.9 kg of the permeating agent, about 2 to 2.1 kg of the insolubilizing agent, and about 4.9 to 5.1 kg of the desizing agent in about 3 tons of the water.

The alkaline compound may be sodium hydroxide (NaOH), sodium carbonate ($Na_2CO_3$), or the mixture thereof, and is preferably sodium hydroxide.

The permeating agent is an agent to enable the scouring agent to soak into the textile substrate, the insolubilizing agent is an agent to maintain an impurity such as the sizing agent in a solid state insoluble in the scouring solution, and the desizing agent is an agent to remove the sizing agent from the textile substrate.

The scouring solution is prepared in such a way that the aforementioned components can be mixed well. For example, about half of a container is filled with the water, a water-soluble alkaline compound such as sodium hydroxide is added thereto, and the resulting mixture is stirred in order to mix the water and alkaline compound well. Subsequently, the other components such as the permeating agent, insolubilizing agent, desizing agent, and so on are further added, and the mixture is stirred. The resulting scouring solution is transferred to a scouring bath.

Optionally, the process of the present invention for removing the sizing agent may further comprise a step of having the textile substrate, which has passed through the scouring solution, pass through a washing solution contained in a washing bath. The washing solution may consist essentially of water.

Optionally, the scouring solution may be contained in a plurality of scouring baths and the washing solution may also be contained in a plurality of washing baths. For example, the textile substrate may pass through the first and second scouring baths and the first, second, and third washing baths, sequentially.

According to an embodiment of the present invention, in order to save the energy while achieving the sizing agent-removing effect in almost same level, the scouring solution in the first scouring bath may be maintained at 50 to 70° C., the scouring solution in the second scouring bath may be maintained at 75 to 95° C., the washing solution in the first washing bath may be maintained at 70 to 90° C., the washing solution in the second washing bath may be maintained at 70 to 90° C., and the washing solution in the third washing bath may be maintained at 40 to 60° C. However, it is most desirable, in view of the sizing agent-removing effect, that the scouring solution and washing solution are maintained at the substantially same temperature.

According to an embodiment of the present invention, in order to effectively removing the impurities such as the sizing agent from the textile substrate and minimize the shrinkage of the textile substrate, the textile substrate may pass through the scouring solution and washing solution at a substantially same speed, e.g., 10 to 21 m/min.

A process for drying the wet textile substrate which has passed through the washing solution may be performed. The drying process may be carried out by means of a steam cylinder. This drying process helps the subsequent heat-setting process be performed effectively.

Then, the heat-setting process may be carried out to fix the shape of the dried textile substrate so that the shape cannot be changed by the external circumstances. In order to minimize the heat shrinkage of the textile substrate and improve the dimensional stability thereof, the heat-setting may be carried out at 150 to 190° C.

After the heat-setting process, a cooling process is performed to lower the temperature of the textile substrate, and then the cooled-down textile substrate is wound. The cooling process may be performed by means of a cooling cylinder.

A coating layer is formed on the textile substrate from which the polyester-based sizing agent has been removed in accordance with the aforementioned method. The coating layer is a layer to improve the mechanical property, air-tightness, air-blocking property, and internal pressure-maintaining property of the airbag fabric.

The coating layer may be formed on one surface or both surfaces of the textile substrate. At least one selected from the group consisting of powdered silicone, liquid silicone, polyurethane, chloroprene, neoprene, polyvinyl chloride, and emulsion-type silicone may be used to form the coating layer. In view of the air-tightness and strength-maintenance during development of the airbag, the coating layer preferably comprises powdered silicone, liquid silicone, aqueous polyurethane dispersion, or a mixture thereof.

The coating amount per unit area is 15 to 150 $g/m^2$, preferably 20 to 140 $g/m^2$, and more preferably 30 to 130 $g/m^2$. If the coating amount is less than 15 $g/m^2$, sufficient scrub resistance and internal pressure-maintaining property cannot be obtained. On the other hand, if the coating amount is more than 150 $g/m^2$, the foldability and storability of the airbag deteriorates remarkably.

Any conventional coating methods such as a knife coating, a doctor blade coating, a spray coating, and so on may be used to form the coating layer. In view of the coating uniformity, the knife coating is desirable.

After the coating layer is formed, an additional process for vulcanization may be carried out. The vulcanizing process may be performed at 150 to 200° C. for 120 to 350 seconds.

Hereinafter, the detailed examples of the present invention and comparative examples will be described to explain the advantages of the present invention. The following examples are provided only for better understanding of the present invention, and the scope of the present invention should not be limited thereto.

Example 1

A PET-based sizing agent (Trademark: TESCOL® PRS warp size, manufactured by Huntsman Corp.) was applied to a polyester (PET) yarn having total linear density of about 500 denier, and a plain weaving was carried out with the sizing agent-applied polyester yarn to obtain a woven fabric having cover factor of 2400.

The woven fabric passed through the scouring solution of pH 8 contained in the first and second scouring baths and the washing solution contained in the first, second, and third washing baths, sequentially, at the speed of about 20 m/min, thereby removing the sizing agent therefrom.

The scouring solution was prepared by dissolving about 2.2 kg of sodium hydroxide, about 1.7 kg of permeating agent (Trademark: P-350, manufactured by Niccakorea Co., Ltd.), about 2 kg of insolubilizing agent (Trademark: K-2500, manufactured by Niccakorea Co., Ltd.), and about 5 kg of desizing agent (Trademark: Texlon CD, manufactured by Daeyang Corp.) in about 3 tons of water. The washing solution consisted essentially of water.

The scouring solution in the first scouring bath was maintained at about 60° C., the scouring solution in the second scouring bath was maintained at about 85° C., the washing solution in the first washing bath was maintained at about 80° C., the washing solution in the second washing bath was maintained at about 80° C., and the washing solution in the third washing bath was maintained at about 50° C.

Subsequently, the woven fabric was dried by means of a steam cylinder, and then passed through a plurality of chambers maintained at 150 to 190° C. so as to be heat-set.

The resulting textile substrate was coated with a liquid silicone resin-based silicone coating composition using a knife coating method, and then dried. The coating amount was 95 $g/m^2$. Subsequently, a vulcanizing process was carried out at 200° C. for 300 seconds to cure the coating composition and complete an airbag fabric having a silicone coating layer.

Example 2

An airbag fabric was made in the same manner as that of the Example 1 except that the amount of the sodium hydroxide dissolved in the water to prepare the scouring solution was about 3 kg and the pH of the scouring solution was 9.

Example 3

An airbag fabric was made in the same manner as that of the Example 1 except that the amount of the sodium hydroxide dissolved in the water to prepare the scouring solution was about 3.8 kg and the pH of the scouring solution was 10.

Example 4

An airbag fabric was made in the same manner as that of the Example 1 except that the scouring solution in the first and second scouring baths and the washing solution in the first, second, and third washing baths were maintained at the same temperature of 80° C.

Comparative Example 1

An airbag fabric was made in the same manner as that of the Example 3 except that an acryl-based sizing agent was used instead of the PET-based sizing agent. Separation of the sizing agent occurred when the woven fabric was manufactured.

Comparative Example 2

An airbag fabric was made in the same manner as that of the Comparative Example 1 except that the amount of the sodium hydroxide dissolved in the water to prepare the scouring solution was about 6 kg and the pH of the scouring solution was 14. Just like the Comparative Example 1, separation of the sizing agent occurred when the woven fabric was manufactured.

Comparative Example 3

An airbag fabric was made in the same manner as that of the Example 1 except that the amount of the sodium hydroxide dissolved in the water to prepare the scouring solution was about 4.2 kg and the pH of the scouring solution was 11.

*Content of Remaining Sizing Agent

The content of the sizing agent remaining in each of the heat-set woven fabrics (the woven fabrics on which the coating layers had not been formed yet) obtained in the Examples 1 to 4 and Comparative Examples 1 to 3 was measured, respectively, according to Soxhlet extraction method.

That is, the weight ($W_F$) of the sample of the woven fabric was measured. Then, in accordance with the Soxhlet extraction method, the sizing agent remaining in the woven fabric sample was extracted using an ethyl ether solvent to obtain an extract solution. The weight ($W_E$) of the extract obtained by evaporating the ether and water from the extract solution was measured. Then, the content of the sizing agent of the heat-set woven fabric was calculated in accordance with the following formula 2, and the results thereof are shown in the following Table 1.

$$\text{Content of Remaining Sizing Agent (\%)} = (W_E/W_F) \times 100 \quad \text{Formula 2:}$$

TABLE 1

|  | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Content of Remaining Sizing Agent (%) | 0.33 | 0.36 | 0.4 | 0.29 | 0.42 | 0.36 | 0.48 |

*Measurement of Stiffness of Airbag Fabric

The stiffness of each of the airbag fabrics obtained in the Examples 1 to 4 and Comparative Examples 1 to 3 was respectively measured according to ASTM D 4032 circular bend procedure, and the results thereof are shown in the following Table 2.

More particularly, a sample (100 mm×200 mm) was obtained from the airbag fabric, folded in half, placed on a platform having an orifice, and pressed by a bar. The force required to force the fabric's entry into the orifice of the platform was measured.

*Measurement of Peel Strength Between Woven Fabric and Coating Layer

The peel strength between the woven fabric and the coating layer of each of the airbag fabrics obtained in the Examples 1 to 4 and Comparative Examples 1 to 3 was respectively measured according to ISO 5981, a standard test method of International Standard Organization, and the results thereof are shown in the following Table 2.

More particularly, the scrub resistance of the fabric was measured by means of a scrub resistance-measuring apparatus in accordance with ISO 5981. First, the airbag fabric was cut into a specimen. While pressed on the apparatus, the fabric specimen was subject to reciprocating motion repetitively for the scrub resistance test.

The scrub resistance was determined by measuring the total number of the reciprocating motion of the abrasive under the pressure force of 10 N. Whether the coating layer was peeled off or not was observed after every 50 strokes of reciprocating motions. If the coating layer was not peeled off, it was regarded as "pass" and the reciprocating motion was continued. If the coating layer was peeled off, it was regarded as "fail," the reciprocating motion was stopped, and the number of strokes performed until the coating layer was peeled off from the woven fabric was regarded as an indicator showing the peel strength of the airbag fabric.

TABLE 2

|  | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Stiffness (kgf) | 1.89 | 1.93 | 1.83 | 1.78 | 1.85 | 1.82 | 4.74 |
| Peel Strength (Stroke No.) | 3000 | 2900 | 2800 | 3000 | 2500 | 2700 | 2300 |

As can be seen from the above Table 2, the stiffness of the airbag fabric manufactured in the Comparative Example 3 was more than 3.5 kgf. If a fabric having stiffness more than 3.5 kgf is used for an airbag for a vehicle, such airbag cannot be developed in a normal shape by air pressure. Further, the airbag fabric manufactured in the Comparative Example 3, of which coating layer was peeled off from the woven fabric right after enduring only 2300 strokes, showed relatively low peel strength compared to the airbag fabrics of the Examples 1 to 4.

The invention claimed is:

1. A method for manufacturing a polyester fabric for an airbag, the method comprising:
    applying a polyester-based sizing agent to a polyester yarn;
    manufacturing a textile substrate with the sizing agent-applied polyester yarn;
    removing the sizing agent from the textile substrate under an alkaline condition of pH 8 to 10 to give a sizing agent-removed textile substrate; and
    forming a coating layer on the sizing agent-removed textile substrate in order to enhance air-tightness,
    wherein the removing the sizing agent comprises having the textile substrate pass through a scouring solution of pH 8 to 10;
    wherein the scouring solution comprises
        water; and
        an alkaline compound, a permeating agent, an insolubilizing agent, and desizing agent, all of which are dissolved in the water; and
    wherein the amount of the alkaline compound is from about 0.073 wt % to about 0.13 wt % to the total weight of the scouring solution.

2. The method of claim 1, wherein 100 parts by weight of the alkaline compound, 160 to 190 parts by weight of the permeating agent, 190 to 220 parts by weight of the insolubilizing agent, and 450 to 550 parts by weight of the desizing agent are dissolved in the water.

3. The method of claim 1, wherein the removing the sizing agent further comprises having the textile substrate, which has passed through the scouring solution, pass through a washing solution.

4. The method of claim 3, wherein the washing solution consists essentially of water.

5. The method of claim 3, wherein the scouring solution is contained in first and second scouring baths,
   the washing solution is contained in first, second, and third washing baths,
   the scouring solution in the first scouring bath is maintained at 50 to 70° C.,
   the scouring solution in the second scouring bath is maintained at 75 to 95° C.,
   the washing solution in the first washing bath is maintained at 70 to 90° C.,
   the washing solution in the second washing bath is maintained at 70 to 90° C., and
   the washing solution in the third washing bath is maintained at 40 to 60° C.

6. The method of claim 3, wherein the textile substrate passes through the scouring solution and washing solution at a speed of 10 to 21 m/min.

7. The method of claim 1, further comprising, prior to forming the coating layer, the steps of:
   drying the sizing agent-removed textile substrate; and
   heat-setting the dried textile substrate.

8. The method of claim 7, wherein the step of heat-setting is carried out at 150 to 190° C.

* * * * *